United States Patent [19]

Buckland

[11] Patent Number: 5,642,347
[45] Date of Patent: Jun. 24, 1997

[54] APPROACH TO DIRECT PERFORMING ASYNCHRONOUS TRANSFER MODE (ATM) ADAPTATION LAYER 5 REASSEMBLY

[75] Inventor: Kenneth M. Buckland, Rohnert Park, Calif.

[73] Assignee: PMC-Sierra, Inc., Burnaby, Canada

[21] Appl. No.: 516,215

[22] Filed: Aug. 17, 1995

[30] Foreign Application Priority Data

Jun. 23, 1995 [CA] Canada ................... 2.152.567

[51] Int. Cl.⁶ .................. H04L 1/00; H04L 12/26
[52] U.S. Cl. ...................... 370/242; 370/395
[58] Field of Search ............. 370/60, 60.1, 94.1, 370/94.2, 13, 110.1; 371/53

[56] References Cited

U.S. PATENT DOCUMENTS 5,511,076  4/1996  Ramakrishnan et al. ......... 370/94.2
5,513,191  4/1996  Takechi et al. ............ 370/60

*Primary Examiner*—Melvin Marcelo
*Attorney, Agent, or Firm*—Pascal & Associates

[57] ABSTRACT

A method of transferring data from an ATM (asynchronous transfer mode) physical device to an application specific circuit (ASIC) comprised of receiving a continuous stream of ATM cells from the ATM physical device, identifying a virtual circuit from a header of each cell, providing an identification (address) of the virtual circuit to an output for reception by the ASIC, providing a continuous stream of payload contents of each cell received from the ATM physical device directly to an output for reception by the ASIC, calculating a cyclic redundancy check (CRC) on data carried by cells forming each packet for each to virtual circuit address and providing an indication to the ASIC of invalid data relating to a packet having a particular virtual circuit in the event the CRC is indicative that data in a packet is incorrect.

10 Claims, 2 Drawing Sheets

APPROACH TO DIRECT PERFORMING ASYNCHRONOUS TRANSFER MODE (ATM) ADAPTATION LAYER 5 REASSEMBLY

FIELD OF THE INVENTION

This invention relates to the field of data transmission, and in particular to apparatus and a method for transferring data from an asynchronous transfer mode (ATM) network to an application specific integrated circuit (ASIC).

BACKGROUND TO THE INVENTION

An ATM network transports data signals requiring various bandwidths using standard size cells, each cell being formed of a predetermined number of bytes. Each cell has a header which identifies what circuit it is to be routed to, and therefore identifies the destination of the cell. Cells are typically related to each other and form packets, wherein all cells of a packet have the same circuit identifier, referred to as a VPI/VCI value.

Variable length data packets are segmented into cells at the point where they enter the ATM realm, and the cells are reassembled into packets at the point where they leave the realm. Circuitry which performs both of these functions are referred to as SARs (segmentation and reassembly).

A SAR typically contains a buffer memory, wherein packets are stored as they are segmented or reassembled. The buffer memory is accessed by a microprocessor via a bus. However, certain kinds of data cannot tolerate storage in a buffer memory, such as a data stream carrying video data from a video telephone and a data stream carrying audio from the same video telephone. In the event either the audio or video data is delayed due to reassembly of packets in the buffer memory, lip sync can be lost. In the event either the audio or video data is delayed in order to synchronize with the other, delays in the transmission of data can disrupt a conversation between two parties, since the timing of remarks and responses can make the conversation erratic and pauses introduced by the system can convey wrong information.

Information about ATM networks and systems may be found in the following publications: PM5346 S/UNI-Lite Data Sheet, PMC-Sierra, Inc. Issue 3, May, 1994; SATURN Compatible Interface for ATM PHY and ATM Layer Devices, PMC-Sierra, Inc., Issue 3, Nov. 1994; ATM User-Network Interface Specification, Version 3.0", ATM Forum, 1993; W. Kelt, G. Fedorkow, C. Bailey, P. Regache, I. Chaudhri, B. Loyer, D. Young, V. Little, S. Christensen, G. Garg and R. Curtis, "An ATM PHY Data Path Interface", ATM Forum, Contribution AF 93-0940, (UTOPIA Specification), 1993.

SUMMARY OF THE INVENTION

The present invention is a method and apparatus for transferring data from a standard interface, referred to herein as an ATM physical device, which receives the ATM cells from a transmission link. The present invention provides the data contents of the cells output by the ATM physical device directly to the inputs of an ASIC, which might be, for example, and MPEG standard digital video handling device. Intermediate data buffering is not required in the present invention, thus eliminating the problem of delays due to storage of data in a memory.

In accordance with an embodiment of the invention, a method of transferring data from an ATM (asynchronous transfer mode) physical device to an application specific circuit (ASIC) is comprised of receiving a continuous stream of ATM cells from the ATM physical device, identifying a virtual circuit from a header of each cell, providing an identification (address) of the virtual circuit to an output for reception by the ASIC, providing a continuous stream of payload contents of each cell received from the ATM physical device directly to an output for reception by the ASIC, calculating a cyclic redundancy check (CRC) on data carried by cells forming each packet for each virtual circuit address and providing an indication to the ASIC of invalid data relating to a packet having a particular virtual circuit in the event the CRC is indicative that data in a packet is incorrect.

In accordance with another embodiment of the invention, a system for providing signals to an application specific circuit (ASIC) from an ATM physical device is comprised of apparatus for receiving and transferring a continuing stream of ATM cells directly from the ATM physical device to an output for reception by the ASIC, apparatus for reading headers of each cell and identifying a virtual circuit therefrom, apparatus for providing identification signals, which identify the virtual circuits at an output, and apparatus for receiving a signal from the ATM physical device indicating the beginning of a new cell, for counting bytes following a receipt of the signal, and for providing an output signal for reception by the ASIC indicating that valid bytes of an ATM cell are being transferred.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
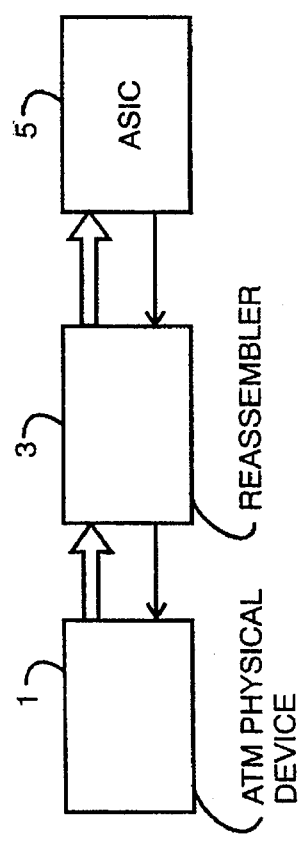
FIG. 1 is a basic block diagram of a preferred embodiment of the invention.

With reference to FIG. 1, ATM data cells are received by an ATM physical device 1, and are provided, with flow control signals via an standard interface known as UTOPIA, to reassembly circuitry 3 which forms an embodiment of the invention, shown in the Figure as pipelined AAL5 circuitry. Reassembly circuitry 3 contains no data buffering. An output bus from circuitry 3 carries cell payloads to application specific integrated circuit (ASIC) 5.

Reassembly circuitry 3 identifies the virtual circuit (VC) of each incoming cell, and performs a cyclic redundancy check (CRC) of each data packet comprised of plural cells. The ASIC is thus presented with packet data on a byte-by-byte basis (RxData and VData), a VC identification value which accompanies each packet byte, an indication of the validity of packet (BadPac), and a indication of the end of each packet (EPDU). When the end of each packet is indicated with an EPDU signal, preferably two bytes indicating the length of the packet are passed on TXData.

Figure 2:
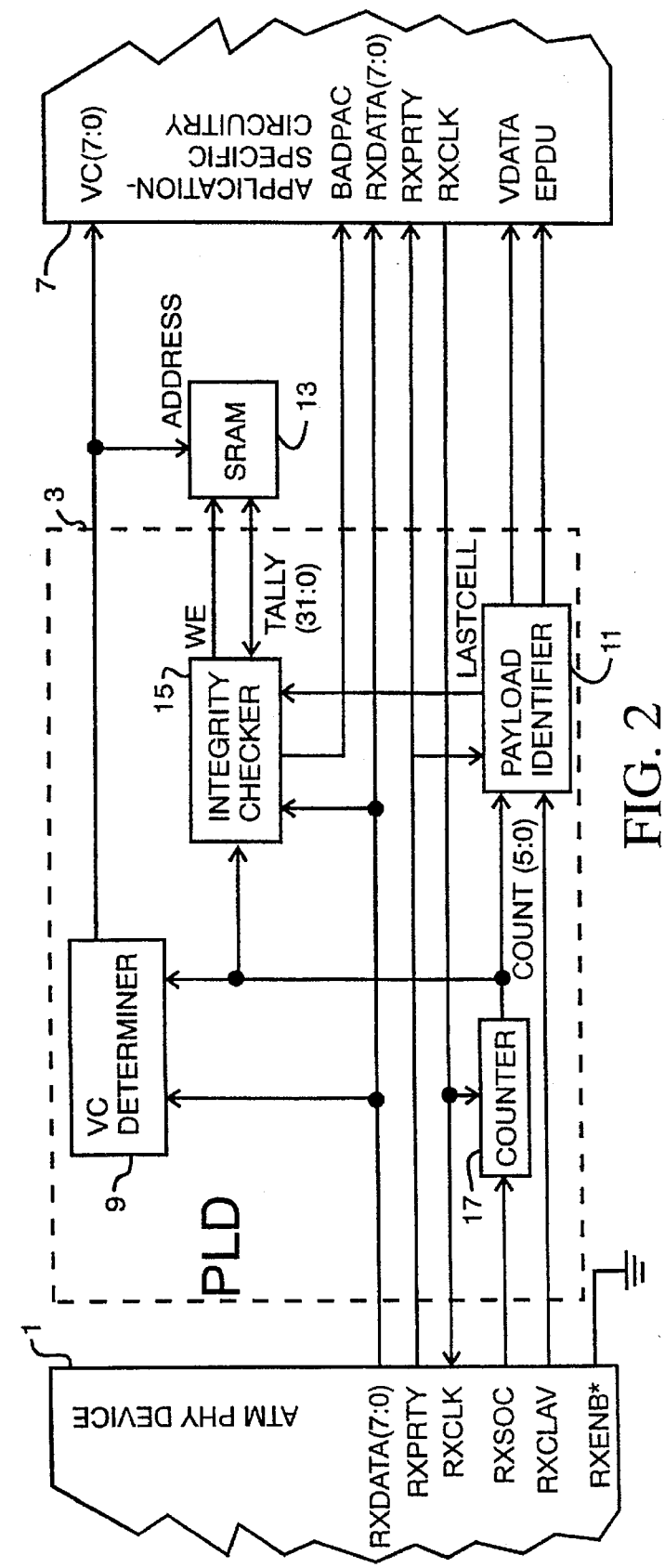
FIG. 2 is a block diagram of the preferred embodiment of the invention.
Figure 3:
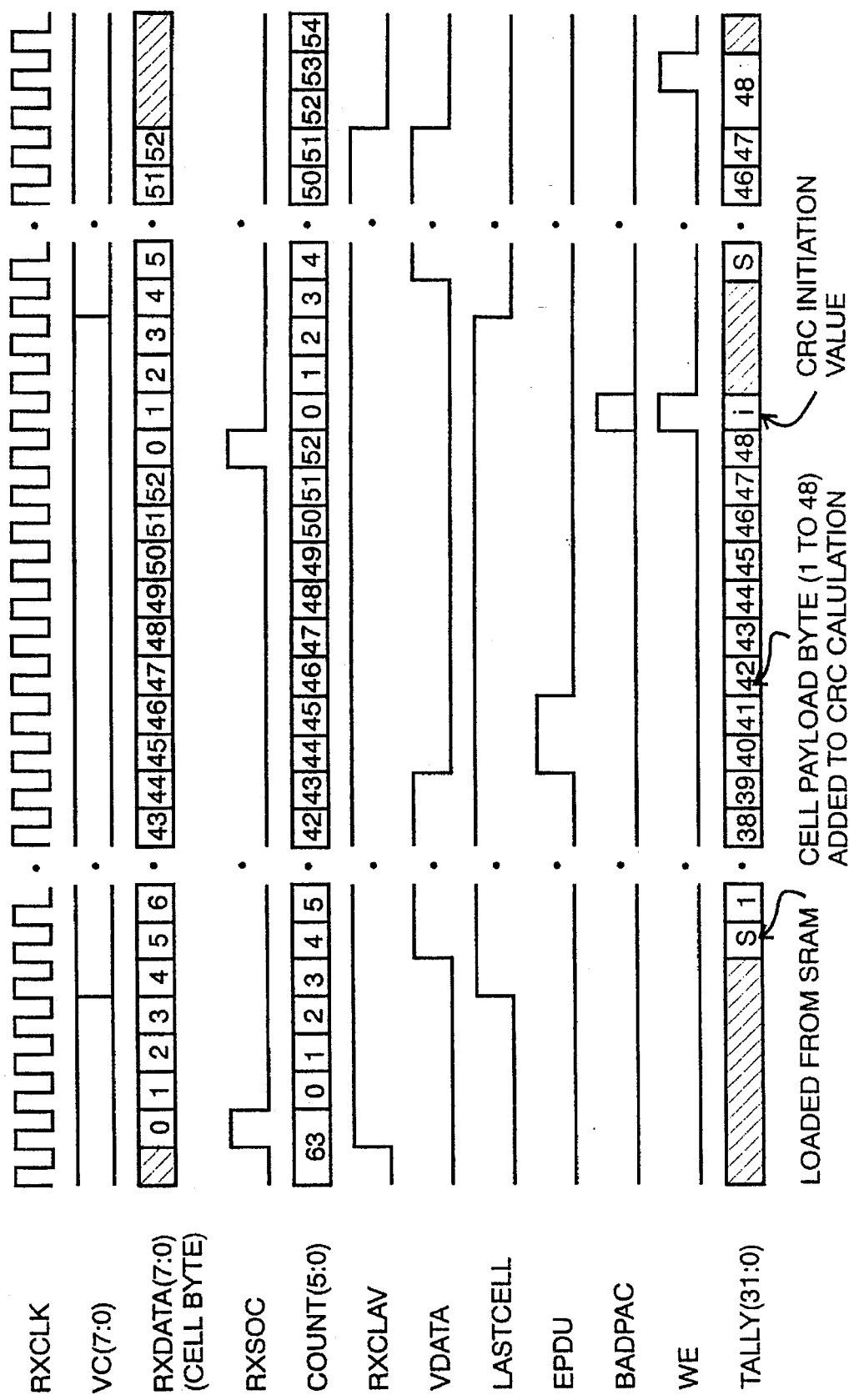
FIG. 3 is a timing diagram of signals used in the preferred embodiment of the invention.

The signals are illustrated in the block diagram of FIG. 2, as well as in the signal timing diagram illustrated in FIG. 3. As may be seen, the ATM physical device 1 outputs standard signals as will be described below.

The RXData (7:0) signal is applied to a similarly designated input on the ASIC. This signal carries the ATM cell bytes (the header and the payload) recovered from the ATM transmission link from the ATM physical device directly to the ASIC without buffering.

The RXPrty signal is an odd parity calculation value of the RxData bits performed in the ATM physical device 1, and is applied directly to the ASIC without buffering.

The RxCLK signal is provided from the ASIC 7 and is applied directly from the ASIC to the ATM physical device. This signal is derived from the RxData signal in a FIFO in the ASIC. The RxClk signal is used by the ATM physical device to synchronize data transfers from the ATM physical device to the ASIC.

The RxSOC signal is a signal output from the ATM physical device which indicates the start of a cell in the RxData signal. When RxSOC is high, the first byte of a cell is present on the RxDATA bus, as may be seen from FIG. 3.

The RxClav signal output from the ATM physical device designates that a receive cell is available to be read. As may be seen from FIG. 3, the signal is at logic high level for at least the entire interval of a cell. When a signal applied to the RxENb* input of the ATM physical device 1 is grounded, the RxClav signal indicates that the current byte on the RxData bus is a byte from a valid ATM cell.

The RxEnb* input to the ATM physical device indicates when a cell can be transferred out of the ATM physical device on the RxData bus. In systems which require buffering, this input receives a low logic level signal which is an enable to transfer a cell via the RxData signal. In the present invention, since the ASIC is to receive ATM cells for processing as soon as they are received over the ATM transmission link, a constant logic low signal is applied to the RxEnb* input, causing a constant flow of cells out of the RxData port of the ATM physical device. With no buffering of the RxData in circuitry 3, maximum throughput without delay is achieved from the ATM physical device 1 to the ASIC 7.

A VC determiner circuit 9 (preferably a programmed logic device PLD) also receives the RxData signal. The VD determiner inspects the headers of the cells, and determines, through a consideration of their VPI/VCI values, what virtual circuit (VC) they are associated with. The cells carrying the same VC form a single data stream. An unlimited number of different data streams, each having an unique VC, can be handled, up to the limit of the PLD capacity, the size of the SRAM, and reasonable throughput, by connecting plural ASICs to the outputs of the reassembler, or by a suitable single ASIC. As may be seen from FIG. 3, the VC signal is provided to the ASIC over the period of all of the bytes of a cell, shifted by the time required to determine the VC (three bytes in the example illustrated).

As noted earlier, the contents of each cell, including their payloads, are passed from the ATM physical device to the ASIC as RxData. In parallel to the passing of the payload, a VData signal is passed to the ASIC from reassembler 3 which indicates whether the data in RxData at any time is a byte from the payload of a valid cell. This VData signal is generated in payload identifier 11, in a manner as will be described later.

The VC data is used to address a static random access memory (SRAM) 13, to facilitate CRC calculations. A data integrity checker 15 receives RxData and an intermediate CRC calculation "tally" from SCRAM 13, and the SRAM stores the ongoing CRC "tally" for each application specific packet. With VC as the address, and upon receipt of a write enable signal (WE) from the integrity checker 15, intermediate CRC tallies (of cells in the same packet, which have the same VC in their headers), calculated by the integrity checker are passed from the integrity checker to the SRAM and are stored in the SRAM and are later recovered for further calculation. The CRC intermediate value for each packet, which is identified by the VC in the header in respective cells, are stored at the same time at different addresses in the SRAM.

When the last cell of a packet arrives, the final CRC calculation for the whole packet is compared in the integrity checker 15 to an expected value (a constant) transmitted in the packet and retrieved by the integrity checker, or predetermined and previously stored in the integrity checker, and the validity of the packet is determined. In the event the CRC value determines that the packet is invalid because of a mismatch between the final CRC value and the constant, a logic signal is applied by the integrity checker 15 to the BadPac output for reception by the ASIC 7 in conjunction with the VC of the packet (see the timing of the BadPac signal, which timing is coincident with the timing of the VC indication signal). The indication of an invalid packet allows the ASIC to respond in some way, such as by rejecting the packet.

Since the ATM physical device can be programmed to discard all cells that have invalid headers, the present invention does not have to handle invalid ATM cell headers (identified by the cell HEC byte). There would be no point to indicating the occurrence of such cells to the ASIC, since there would be no way of determining exactly which application specific stream (VC) they are related to.

Considering true=1, and false=0, and all values being latched at the end of each RxClk (receive clock) period, a more detailed description of operation of the circuit in accordance with a preferred embodiment follows.

A counter receives an RxSOC signal from the ATM physical device 1, which indicates the start of a cell (see the timing of the RxSOC signal in FIG. 3). When RxSOC is logic high, the first byte of a cell is present on RxData. The RxClk clock signal received from the ASIC is received by the counter 17 which counts bytes. This byte count is applied to the payload identifier 11, which receives the RxData signal, and is used to extract specific contents from each cell, such as an indication of the end of each packet. Because of the timing, the count value in counter 17 is 0 when the second byte of a cell passes via the RxData lead (see FIG. 3), and is 51 when the last byte passes. The count is clocked by RxClk. In the event the count reaches 63, far in excess of a standard ATM cell byte count of 52, the clock should stop at that value of 63.

The VC determiner 9 determines the VC (identifies the application specific data stream) of each cell passing via the RxData bus. It does this by inspecting the VPI/VCI value of each cell, knowing where this is by receiving a byte count from counter 17. In its simplest form, the VC can be determined by recovering some number of least significant bits from the combined VPI/VCI value in the header of the cell. This approach requires that the VPI/VCI values should be set at the cell transmission source to fall into a contiguous range. However more elaborate schemes for VC determination may be used. Once VC has been determined, its value is latched until the next cell passes on the RxData bus.

The payload identifier 11 can determine when the last cell of a packet has arrived, by operating in accordance with the following transfer function, expressed in pseudo-code:

Lastcell={(Count #2)×Lastcell}+{(Count=2)×RxData(0)×not(Rx-Data{2}×RxClav where RxClav is a signal received from the ATM physical device 1 that indicates that a full cell is available to be read.

When RxEnb* is grounded, as it is in the present invention, it facilitates a constant flow of cell data on the RxData bus.

To determine when a given byte on RxData contains valid application specific data (VData):

VData = {(Count<=42) + (not(Lastcell) × (Count
<= 50))} z
(Count >= 3) × RxClav

To determine when the last byte of an application specific packet has just passed on the RxData bus:

EPDU=(Count=43+Count=44)×Lastcell×RxClav

The integrity checker 15 performs the CRC calculation which determines the validity of each application specific packet, and is preferred to operate as follows, wherein "Tally" is the intermediate CRC calculated value:

Tally = SRAM output if (Count = 3) {using VC as
address} = $f_{CRC}$(Tally, L(x))
if (Count =
7,11,15,19,23,27,31,35,39,43,47 or 51)
= Tally if count = 52 × not(Lastcell)
= CRC init. value if (Count = 52 × Lastcell WE = (Count = 52)

Badpac = (Count = 52) × Lastcell × (Tally # expected CRC value).

For these calculations, four bytes (32 bits) of cell payload are stored (in order) for each CRC calculation cycle, producing L(x). This results in twelve such cycles per cell. The initialization value for the CRC calculation is 32 "1's". The following calculation should be made during each cycle:

$$f_{CRC}(Tally, L(x))=X^{32} L(X)/G(X)$$

where

L(x) is the 32 bits of cell payload (four RxData Bytes) and
$G(x)=X^{32}+X^{26}+X^{23}+X^{22}X^{16}+X^{12}+X^{11}+X^{10}+X^{8}+X^{5}+X^{4}+X^{2}+X+1$ The expected CRC value at the end of the payload is:

| 11000111 | 00000100 | 11011101 | 01111011 |
| --- | --- | --- | --- |

The payload identifier 11 provides a VData (valid data) signal to an output for reception by the ASIC, which is an indicator of when valid application specific data is being carried on the RxData bus. Similarly it determines when the last byte of a packet has passed on the RxData bus, and provides an indication signal EPDU at the correspondingly labelled output. Preferably this signal remains high for the two bytes of the packet length specification.

A person understanding this invention may now conceive of alternative structures and embodiments or variations of the above. All of those which fall within the scope of the claims appended hereto are considered to be part of the present invention.

I claim:

1. A method of transferring data from an ATM (asynchronous transfer mode) physical device to an application specific circuit (ASIC) comprising:

(a) receiving a continuous stream of ATM cells from the ATM physical device,
(b) identifying a virtual circuit from a header of each cell,
(c) providing an identification of the virtual circuit to an output for reception by the ASIC,
(d) providing a continuous stream of payload contents of each cell received from the ATM physical device directly to an output for reception by the ASIC,
(e) calculating a cyclic redundancy check (CRC) on data carried by cells forming each packet for each virtual circuit identification and providing an indication to the ASIC of invalid data relating to a packet having a particular virtual circuit in the event the CRC is indicative that data in a packet is incorrect.

2. A method as defined in claim 1 including retaining an ongoing result of a CRC calculation for each respective packet for each virtual circuit in a memory until the conclusion of the respective packet, comparing the ongoing result at the conclusion of the respective packet with a corresponding constant, and providing said indication of invalid data relating to the respective packet in the event the ongoing result at the conclusion of the respective packet does not match the corresponding constant.

3. A method as defined in claim 2 in which the memory is a static random access memory (SRAM).

4. A method as defined in claim 2 including receiving a signal from the ATM physical device indicating the beginning of a new cell, beginning a byte count of data in the cell from the reception of the signal indicating the beginning of a new cell, and stopping the count at a predetermined value larger than a predetermined number of expected bytes in a cell in the event a signal indicating the end of a cell is not received from the ATM physical device.

5. A method as defined in claim 2 including maintaining said identification of the virtual circuit while said indication of invalid data is being provided.

6. A method as defined in claim 5 including maintaining said identification of the virtual circuit for an interval of at least one cell of a packet following a packet being identified.

7. A system for providing signals to an application specific circuit (ASIC) from an ATM physical device comprising:

(a) means for receiving and transferring a continuing stream of ATM cells directly from the ATM physical device to an output for reception by the ASIC,
(b) means for reading headers of each cell and identifying a virtual circuit therefrom,
(c) means for providing identification signals which identify said virtual circuits at an output, and
(d) means for receiving a signal from the ATM physical device indicating the beginning of a new cell, for counting bytes following a receipt of said signal, and for providing an output signal for reception by the ASIC indicating that valid bytes of an ATM cell are being transferred.

8. A system as defined in claim 7 including means for performing a cyclic redundancy check (CRC) on bytes of data of said cells relating to a packet of data having a header identifying a particular circuit and providing an indication to an output for reception by the ASIC of an invalid packet of cells in the event the CRC check fails.

9. A system as defined in claim 8 including a static random access memory (SRAM) for receiving and storing an ongoing CRC count relating to a particular packet of data, means for comparing said count at the termination of a packet with a constant, and providing said indication of invalid data relating to the respective packet in the event said count at the termination of packet is not the same as said constant.

10. A system as defined in claim 8 including means for applying signals corresponding to said identifying signals to an SRAM as addresses, means for receiving and storing ongoing CRC counts relating to plural packets at corresponding ones of said addresses, means for comparing each ongoing CRC count at the conclusion of a frame with a constant relating to that frame, and means for providing said indication of invalid data relating to a just concluded frame to an output for reception by the ASIC while the identification signal for that frame is being output.

* * * * *